US006271853B1

(12) United States Patent
Oxaal

(10) Patent No.: US 6,271,853 B1
(45) Date of Patent: Aug. 7, 2001

(54) METHOD FOR GENERATING AND INTERACTIVELY VIEWING SPHERICAL IMAGE DATA

(76) Inventor: Ford Oxaal, 42 Western Ave., Cohoes, NY (US) 12047

( * ) Notice: Subject to any disclaimer, the term of this patent is extended or adjusted under 35 U.S.C. 154(b) by 0 days.

(21) Appl. No.: 09/349,240

(22) Filed: Jul. 8, 1999

Related U.S. Application Data

(63) Continuation of application No. 08/813,873, filed on Mar. 7, 1997, now Pat. No. 5,936,630, which is a continuation of application No. 08/478,839, filed on Jun. 7, 1995, now Pat. No. 5,684,937, which is a continuation of application No. 07/990,250, filed on Dec. 14, 1992, now abandoned, application No. 09/349,240, which is a continuation of application No. 09/228,760, filed on Jan. 12, 1999, and a continuation-in-part of application No. 08/749,166, filed on Nov. 14, 1996, now Pat. No. 5,903,782

(60) Provisional application No. 60/071,148, filed on Jan. 12, 1998, and provisional application No. 60/006,800, filed on Nov. 15, 1995.

(51) Int. Cl.[7] .................................................. G06F 15/00
(52) U.S. Cl. .............................................................. 345/425
(58) Field of Search ..................................... 345/427, 425, 345/419, 418, 433; 382/293

(56) References Cited

U.S. PATENT DOCUMENTS

| 1,730,346 | 10/1929 | Beeson et al. . |
| 3,183,810 | 5/1965 | Campbell et al. . |
| 3,723,805 | 3/1973 | Scarpino et al. . |
| 4,125,862 | 11/1978 | Catano . |
| 4,152,724 | 5/1979 | Hunter . |
| 4,172,264 | 10/1979 | Taylor et al. ........................ 338/185 |

(List continued on next page.)

FOREIGN PATENT DOCUMENTS

| 2-127877 | 5/1990 | (JP) . |
| 82/03712 | 10/1982 | (WO) . |
| 96/08105 | 3/1995 | (WO) . |
| 96/26611 | 8/1996 | (WO) . |

OTHER PUBLICATIONS

Richard J. Felix, "The Omnigraph" , pp. 1–2, Jun. 1994.
NASA's Tina Camera Has a Wide–Angle Future, Science & Technology, Business Week, pp. 54–55, Mar. 6, 1995.
G. David Ripley, "DVI–A Digital Multimedia Technology", Communications of the ACM Jul. 1989, vol. 32 No. 7. pp. 811–822.
M. Onoe et al., "Digital Processing of Images Taken by Fish–Eye Lens", IEEE: Proceedings, New York 1982, vol. 1, pp. 105–108.

(List continued on next page.)

Primary Examiner—Phu K. Nguyen
(74) Attorney, Agent, or Firm—Westerlund & Powell P.C.; Raymond H.J. Powell, Jr.; Robert A. Westerlund

(57) ABSTRACT

A method of modeling of the visible world using a spherical image data set includes steps for generating the spherical image data set, selecting a viewpoint within a p-surface, and texture mapping selected data from the spherical image data set onto the p-surface such that the resultant texture map is substantially equivalent to projecting the selected data onto the p-surface from the viewpoint to thereby generate a texture mapped p-surface. According to one aspect of the invention, the method also includes a step for either rotating the texture mapped p-surface or changing the direction of view to thereby expose a new portion of the texture mapped p-surface. According to another aspect of the invention, a first the texture mapped p-sphere is replaced by a second texture mapped p-sphere by interactively selecting the new viewpoint from viewpoints within the second texture mapped p-sphere.

48 Claims, 20 Drawing Sheets

U.S. PATENT DOCUMENTS

| | | |
|---|---|---|
| 4,191,967 | 3/1980 | Dansac et al. . |
| 4,214,821 | 7/1980 | Termes .................................. 352/70 |
| 4,334,245 | 6/1982 | Michael .............................. 358/183 |
| 4,463,380 | 7/1984 | Hooks, Jr. . |
| 4,518,898 | 5/1985 | Tarnowski et al. . |
| 4,549,208 | 10/1985 | Kamejima et al. . |
| 4,563,703 | 1/1986 | Taylor et al. ........................ 358/160 |
| 4,591,250 | 5/1986 | Woodruff . |
| 4,656,506 | 4/1987 | Ritchey ................................ 358/87 |
| 4,661,855 | 4/1987 | Glcku . |
| 4,670,648 | 6/1987 | Hall et al. . |
| 4,728,839 | 3/1988 | Coughlan et al. . |
| 4,734,779 | 3/1988 | Levis et al. .......................... 358/231 |
| 4,736,436 | 4/1988 | Yasukawa et al. . |
| 4,751,660 | 6/1988 | Hedley . |
| 4,772,942 | 9/1988 | Tuck . |
| 4,797,942 | 1/1989 | Burt . |
| 4,807,158 | 2/1989 | Branton et al. . |
| 4,835,532 | 5/1989 | Fant . |
| 4,843,568 | 6/1989 | Krueger et al. ........................ 358/93 |
| 4,858,002 | 8/1989 | Zobel . |
| 4,858,149 | 8/1989 | Quarendon . |
| 4,899,293 | 2/1990 | Dawson et al. . |
| 4,918,473 | 4/1990 | Blackshear . |
| 4,924,094 | 5/1990 | Moore . |
| 4,949,108 | 8/1990 | Verret .................................... 354/81 |
| 5,005,083 | 4/1991 | Grage et al. . |
| 5,020,114 | 5/1991 | Fujioka et al. . |
| 5,023,725 | 6/1991 | McCutchen . |
| 5,048,102 | 9/1991 | Tararine et al. . |
| 5,067,019 | 11/1991 | Juday et al. . |
| 5,068,735 | 11/1991 | Tuchiya et al. . |
| 5,077,609 | 12/1991 | Manelphe . |
| 5,130,794 | 7/1992 | Ritchey . |
| 5,157,491 | 10/1992 | Kassatly . |
| 5,159,368 | 10/1992 | Zemln . |
| 5,173,948 | 12/1992 | Blackham et al. . |
| 5,175,808 | 12/1992 | Sayre . |
| 5,185,667 | 2/1993 | Zimmerman . |
| 5,200,818 | 4/1993 | Neta et al. . |
| 5,231,673 | 7/1993 | Elenga . |
| 5,259,584 | 11/1993 | Wainwright . |
| 5,280,540 | 1/1994 | Addeo et al. . |
| 5,313,306 | 5/1994 | Kuban et al. . |
| 5,359,363 | 10/1994 | Kuban et al. . |
| 5,384,588 | 1/1995 | Martin et al. . |
| 5,396,583 | 3/1995 | Chen et al. . |
| 5,432,871 | 7/1995 | Novik . |
| 5,444,476 | 8/1995 | Conway . |
| 5,479,203 | 12/1995 | Kawai et al. . |
| 5,499,146 | 3/1996 | Donahue et al. ................... 360/33.1 |
| 5,539,483 | 7/1996 | Nalwa .................................... 353/94 |
| 5,550,646 | 8/1996 | Hassan et al. . |
| 5,606,365 | 2/1997 | Maurinus et al. . |
| 5,682,511 | 10/1997 | Sposato et al. . |
| 5,684,937 * | 11/1997 | Oxaal .................................. 345/427 |

OTHER PUBLICATIONS

N. Greene, "Environment Mapping and Other Application, of World Projections", IEEE Computer Graphics and Applications, Nov. 1986, pp. 21–29.

N. Greene, "A Method of Modeling Sky for Computer Animations", Proc. First Int'l. Conf. Engineering and Computer Graphics, Aug. 1984, pp. 297–300.

J. Blinn et al., "Texture and Reflection in Computer Generated Images," Comm. ACM, vol. 19, No. 10 1976, pp. 542–547.

F. Kenton Musgrave, "A Panoramic Virtual Screen for Ray Tracing", Graphics Gems, 1992, pp. 288–294.

J.D. Foley, et al., "Computer Graphics: Principles and Practice", 1990, 1996, pp. 229–381.

Douglas F. Dixon "DVI Video Graphics," Computer Graphics World, Jul. 1987.

S. Morris, "Digital Video Interactive–A New Integrated Format for Multi–Media Information", Microcomputer for Information Management, Dec. 1987, 4(4):249–261.

"Declaration of Scott Gilbert in Support of Defendant Infinite Pictures" Memorandum in Opposition to Plaintiff's Motion for Preliminary Injunction, Omniview, Inc. v. Infinite Pictures, Inc. Civ. Action No. 3–96–849.

A. Paeth, "Digital Cartography for Computer Graphics", Graphics Gems, 1990. pp. 307–320.

N. Greene et al., Creating Raster Omnimax Images from Multiple Perxpective Views Using the Elliptical Weighted Average Filter, IEEE Computer Graphics and Applications, Jun. 1986, pp. 21–27.

S. Ray, "The Lens in Action", Hastings House, 1976, pp. 114–117.

F. Pearson II, "Map Projections Theory and Applications". CRC Press, Inc., 1990, pp. 215–345.

G. Wolbert, "Digital Image Warping", IEEE Computer Society Press. 1988.

Ritchey "Image Based Panoramic Virtual Realm System" pp. 2–14, Feb. 1992.

* cited by examiner

FIG. 9A

```c
/* Includes required */
#include <GL/gl.h>
include <GL/glut.h>
#include <stdio.h>
#include <ppm.h>
#include <math.h>

/**
 * something because of windows
 */
void __eprintf() {
}

/**
 * our data structure of choice
 */
typedef struct obj {
    /* other parameters */
    float matrix[16];

/* view angle */
    float viewangle;

/* aspect ratio */
    float aspect;

/* z of the camera */
    float tz;

/* ry of the camera */
    float ry;
} Obj;

/* hold the display lists for textures */
typedef struct texture {
    int tex1;
    int tex2;
} Texture;

/**
 * our global variables
 */
/* camera settings */
Obj scene;
```

FIG. 9B

```
/* texture stuff */
Texture def;
Texture* current_texture = &def;

/* track the next display list number */
int nextDLnum = 2;

/* stuff for lighting */
float lightPos[4] = {2.0, 4.0, 2.0, 0};
float lightDir[4] = {0, 0, 1.0, 1.0};
float lightAmb[4] = {0.4, 0.4, 0.4, 1.0};
float lightDiff[4] = {0.8, 0.8, 0.8, 1.0};
float lightSpec[4] = {0.8, 0.8, 0.8, 1.0};
int lights = 0;
int outsideView = 0;
int parent;

#define HEMISPHERE 1
void createHemisphere(int listNum, int numPts, int geom);

/**
 * Read in the ppm files and create display lists for a texture
 * returns the dimension of the image
 */
pixel **map1, **map2;
GLubyte *tex1, *tex2, **tmpPP, *tmpP;
void readTexture(Texture* t, char* file1, char* file2) {
    FILE *fp1, *fp2;
    int cols, rows, i, j, index;
    pixval maxval;

/* open the files */
    fp1 = fopen(file1, "r");
    fp2 = fopen(file2, "r");
    if (!fp1) {
      fprintf(stderr, "Couldn't open %s\n", file1);
    }
    if (!fp2) {
      fprintf(stderr, "Couldn't open %s\n", file2);
    }

/* read the ppm files */
    map1 = ppm_readppm(fp1, &cols, &rows, &maxval);
    fprintf(stderr, "%s: rows = %d \t cols = %d\n", file1, rows,
    cols, maxval);
    map2 = ppm_readppm(fp2, &cols, &rows, &maxval);
```

FIG. 9C

```c
    fprintf(stderr, "%s: rows = %d \t cols = %d\n", file2, rows,
cols, maxval);

/* convert them */
    tex1 = malloc(sizeof(GLubyte) * rows * cols * 3);
    tex2 = malloc(sizeof(GLubyte) * rows * cols * 3);
    index = 0;
    for (i = 0; i < rows; i++) {
     for (j = 0; j < cols; j++) {
        /* R */
        tex1[index] = PPM_GETR(map1[i][j]);
        tex2[index] = PPM_GETR(map2[i][j]);
        index ++;

/* G */
        tex1[index] = PPM_GETG(map1[i][j]);
        tex2[index] = PPM_GETG(map2[i][j]);
        index ++;

/* B */
        tex1[index] = PPM_GETB(map1[i][j]);
        tex2[index] = PPM_GETB(map2[i][j]);
        index ++;
     }
    }

/* create the textures */
    /* new display list*/
    glNewList(nextDLnum, GL_COMPILE);
    t->tex1 = nextDLnum;
    nextDLnum++;
    glTexImage2D(GL_TEXTURE_2D, 0, 3, cols, rows, 0, GL_RGB,
GL_UNSIGNED_BYTE,
            tex1);
    glEndList();

/* new display list*/
    glNewList(nextDLnum, GL_COMPILE);
    t->tex2 = nextDLnum;
    nextDLnum++;
    glTexImage2D(GL_TEXTURE_2D, 0, 3, cols, rows, 0, GL_RGB,
GL_UNSIGNED_BYTE'
            tex2);
    glEndList();
}
```

FIG. 9D

```c
/**
 * this will initialize the display lists for the objects
 */
void initialize_objects(int argc, char**argv) {
    float tmp[4];

/* read in the texture */
    readTexture(&def, argv[1], argv[2]);

/* create hemisphere */
    createHemisphere(1, 50, GL_TRIANGLE_STRIP);

/* scene */
    scene.viewangle = 130;
    scene.tz = 0;
    scene.ry = 0;
}

/*
 * Clear the screen. draw the objects
 */
void display()
{
    float tmp[4];
    float height;

/* clear the screen */
    glClear(GL_COLOR_BUFFER_BIT | GL_DEPTH_BUFFER_BIT);

/* adjust for scene orientation */
    glMatrixMode(GL_PROJECTION);
    if (outsideView) {
     glLoadIdentity();
     gluPerspective(45, scene.aspect, 0.1, 10.0);
     glTranslatef(0, 0, -3);
     glRotatef(45, 1, 0, 0);
     glRotatef(45, 0, 1, 0);
     glDisable(GL_TEXTURE_2D);
     glColor3f(.8, .8, .8);
    } else {
     glLoadIdentity();
     gluPerspective(scene.viewangle, scene.aspect, 0.1, 10.0);
     glTranslatef(0, 0, scene.tz);
     glRotatef(scene.ry, 0, 1, 0);
    }
```

FIG. 9E

```
/* draw our models */
glMatrixMode(GL_MODELVIEW);
glPushMatrix();

if (outsideView) {
 /* transform to where the camera would be */
 glPushMatrix();

/* draw a cube for the camera */
 glLoadIdentity();
 glRotatef(180, 1, 0, 0);
 glTranslatef(0, 0, scene.tz);
 tmp[0] = tmp[1] = tmp[2] = .8;
 tmp[3] = 1;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCube(.1);

/* draw a cone for the view frustrum */
 glLoadIdentity();
 height = 1 - scene.tz;
 glRotatef(45, 0, 0, 1);
 glTranslatef(0, 0, -1);
 tmp[0] = tmp[1] = 1;
 tmp[2] = 0;
 tmp[3] = .3;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCone(tan(scene.viewangle * 3.14 / 360.0) * height,
height, 20, 1);
 glPopMatrix();
 glEnable(GL_TEXTURE_2D);
 }

/* now draw the semisphere */
 if (lights) {
  tmp[0] = tmp[1] = tmp[2] = .8;
  tmp[3] = .8;
  glMaterialfv(GL_FRONT_AND_BACK, GL_SPECULAR, tmp);
  glMaterialf(GL_FRONT_AND_BACK, GL_SHININESS, 10.0);
  glMaterialfv(GL_FRONT_AND_BACK, GL_AMBIENT_AND_DIFFUSE, tmp);
  }
  glCallList(current_texture->tex1);
  glCallList(HEMISPHERE);
```

FIG. 9F

```c
    if (lights) {
     tmp[0] = tmp[1] = tmp[2] = .5;
     tmp[3] = .5;
     glMaterialfv(GL_FRONT_AND_BACK, GL_SPECULAR, tmp);
     glMaterialf(GL_FRONT_AND_BACK, GL_SHININESS, 10.0);
     glMaterialfv(GL_FRONT_AND_BACK, GL_AMBIENT_AND_DIFFUSE, tmp);
    } glRotatef(180.0, 0.0, 0.0, 1.0);
    glCallList(current_texture->tex2);
    glCallList(HEMISPHERE);
    glPopMatrix();

fprintf(stderr, "%s\n", gluErrorString(glGetError()));
    glutSwapBuffers();
}

/*
 * Handle Menus
 */
#define M_QUIT 1
void Select(int value)
{
    switch (value) {
    case M_QUIT:
        exit(0);
        break;
    }
    glutPostRedisplay();
}
void create_menu() {
    fprintf(stderr, "Press ? for help\n");
    glutCreateMenu(Select);
    glutAddMenuEntry("Quit", M_QUIT);
    glutAttachMenu(GLUT_RIGHT_BUTTON);
}

/* Initializes hading model */
void myInit(void)
{
    glEnable(GL_DEPTH_TEST);
    glShadeModel(GL_SMOOTH);

/* texture stuff */
    glPixelStorei(GL_UNPACK_ALIGNMENT, sizeof(GLubyte));
    glTexParameterf(GL_TEXTURE_2D, GL_TEXTURE_WRAP_S, GL_CLAMP);
    glTexParameterf(GL_TEXTURE_2D, GL_TEXTURE_WRAP_T, GL_CLAMP);
```

FIG. 9G

```
    glTexParameterf(GL_TEXTURE_2D, GL_TEXTURE_MAG_FILTER,
GL_NEAREST);
    glTexParameterf(GL_TEXTURE_2D, GL_TEXTURE_MIN_FILTER,
GL_NEAREST);
    glTexEnvf(GL_TEXTURE_ENV, GL_TEXTURE_ENV_MODE, GL_DECAL);
    glEnable(GL_TEXTURE_2D);

}

/*
 *  Called when the window is first opened and whenever
 *  the window is reconfigured (moved or resized).
 */
void myReshape(int w, int h)
{
    glViewport (0, 0, w, h);              /* define the viewport */
    scene.aspect = 1.0*(GLfloat)w/(GLfloat)h;
    glMatrixMode(GL_PROJECTION);
    glLoadIdentity();
    gluPerspective(scene.viewangle, scene.aspect, 0.1, 10.0);
    glMultMatrixf(scene.matrix);
    glMatrixMode (GL_MODELVIEW);          /* back to modelview
    matriix */
}

/*
 * Keyboard handler
 */
void
Key(unsigned char key, int x, int y)
{
    float matrix[16];
    glMatrixMode(GL_MODELVIEW);
    glGetFloatv(GL_MODELVIEW_MATRIX, matrix);
    glLoadIdentity();
    fprintf(stderr, "%d - %c  ", key, key);
    switch (key) {
    case 'o':
     if (!outsideView) {
        fprintf(stderr, "outside on  ");
        outsideView = 1;

/* turn on blending */
        glEnable(GL_BLEND);
        glBlendFunc(GL_SRC_ALPHA, GL_ONE_MINUS_SRC_ALPHA);
```

FIG. 9H

```
    /* We want to see color */
    glTexEnvf(GL_TEXTURE_ENV, GL_TEXTURE_ENV_MODE, GL_MODULATE);

/* turn on our spotlight */
    glEnable(GL_LIGHT1);
    glLightfv(GL_LIGHT1, GL_AMBIENT, lightAmb);
    glLightfv(GL_LIGHT1, GL_DIFFUSE, lightDiff);
    glLightfv(GL_LIGHT1, GL_SPECULAR, lightSpec);
    glLightfv(GL_LIGHT1, GL_SPOT_DIRECTION, lightDir);
 } else {
    fprintf(stderr, "outside off  ");
    outsideView = 0;
    glTexEnvf(GL_TEXTURE_ENV, GL_TEXTURE_ENV_MODE, GL_DECAL);
    glDisable(GL_BLEND);
 }
 break;
case 'F':
 fprintf(stderr, "flat   ");
 glShadeModel(GL_FLAT);
 break;
case 'f':
 fprintf(stderr, "smooth   ");
 glShadeModel(GL_SMOOTH);
 break;
case 'y':
 printf("ry = %f\n", scene.ry);
 scene.ry -= 5;
 break;
case 'Y':
 scene.ry += 5;
 break;
case 'z':
 scene.tz -= .02;
 fprintf(stderr, " tz = %f  ", scene.tz);
 break;
case 'Z':
 scene.tz += .02;
 fprintf(stderr, " tz = %f  ", scene.tz);
 break;
case 'a':
 scene.viewangle -= 1;
 fprintf(stderr, " angle: %f  ", scene.viewangle);
```

FIG. 9I

```
   break;
  case 'A':
   scene.viewangle += 1;
   fprintf(stderr, "angle: %f  ", scene.viewangle);
   break;
  case 55:
   glRotatef(-5, 0.0, 0.0, 1.0);
   break;
  case 57:
   glRotatef(5, 0.0, 0.0, 1.0);
   break;
  case 52:
   glRotatef(-5, 0.0, 1.0, 0.0);
   break;
  case 54:
   glRotatef(5, 0.0, 1.0, 0.0);
   break;
  case 56:
   glRotatef(5, 1.0, 0.0, 0.0);
   break;
  case 50:
   glRotatef(-5, 1.0, 0.0, 0.0);
   break;
  case 'q':
   if (lights) {
       glDisable(GL_LIGHT0);
       glDisable(GL_LIGHTING);
       lights = 0;
       fprintf(stderr, "no lights  ");
   } else {
       glEnable(GL_LIGHTING);
       glEnable(GL_LIGHT0);
       glLightfv(GL_LIGHT0, GL_POSITION, lightPos);
       glLightfv(GL_LIGHT0, GL_AMBIENT, lightAmb);
       glLightfv(GL_LIGHT0, GL_DIFFUSE, lightDiff);
       glLightfv(GL_LIGHT0, GL_SPECULAR, lightSpec);
       lights = 1;
       fprintf(stderr, "lights   ");
   }
   break;
  case 't':
   fprintf(stderr, "texture off  ");
   glDisable(GL_TEXTURE_2D);
   break;
  case 'T':
   fprintf(stderr, "texture on   ");
   glEnable(GL_TEXTURE_2D);
   break;
```

FIG. 9J

```
    case '?':
     fprintf(stderr, "hjkl - rotate current object\n");
     fprintf(stderr, "s/S - shrink / grow the object or zoom the
scene\n");
     fprintf(stderr, "a/A viewangle\n");
     fprintf(stderr, "z/Z camera position\n");
     fprintf(stderr, "f/F flat smooth\n");
     fprintf(stderr, "Escape quits \n");
     break;
    case 27:            /* Esc will quit */
        exit(1);
        break;
    default:
     fprintf(stderr, "Unbound key - %d  ", key);
     break;
    }
    fprintf(stderr, "\n");
    glMultMatrixf(matrix);
    glutPostRedisplay();
}

/*
 * Main Loop
 * Open window with initial window size, title bar,
 * RGBA display mode, and handle input events.
 */
int main(int argc, char** argv)
{
    glutInit(&argc, argv);
    glutInitDisplayMode (GLUT_DOUBLE | GLUT_RGBA);
    parent = glutCreateWindow (argv[0]);
    myInit();
    glutKeyboardFunc(Key);
    glutReshapeFunc (myReshape);
    glutDisplayFunc(display);
    create_menu();
    initialize_objects(argc, argv);
    glutMainLoop();
}
```

FIG. 10A

```c
#ifdef WINDOWS
#include <windows.h>
#endif
#include <GL/gl.h>
include <GL/glut.h> include "warp.h"
include <stdio.h>
/**
 * Triangulate a hemisphere and texture coordinates.
 * listNum - display list number
 * numPts -  number of points to a side
 * return the display list
 */
void createHemisphere(int listNum, int numPts, int geom) {
    double incr = 1.0 / numPts;
    double u, v, x, y, z;
    float tx, tz;
    int i, j;

/* start the display list */
    glNewList(listNum, GL_COMPILE_AND_EXECUTE);

/* create the coordinates */
    /* use the square to circle map */
    /* across then down */
    v = 0;
    for (j = 0; j < numPts ; j++) {
     /* start the tri strip */
     glBegin(geom);
     u = 0;
     for (i = 0; i <= numPts; i++) {
        /* do the top point */
        /* get the XYZ coords */
        map(u, v, &x, &y, &z);

/* create the texture coord */
        tx = x / 2 + .5;
        tz = z / 2 + .5;
        if (tx > 1.0 || tz > 1.0 || tx < 0.0 || tz < 0.0) {
         printf("not in range %f %f\n", tx, tz);
        }
        glTexCoord2f(tx, tz);
```

FIG. 10B

```
    /* normal */
    glNormal3f(x, y, z);

/* create the coord */
    glVertex3f(x, y, z);

/* get the XYZ coords */
    map(u, v + incr, &x, &y, &z);

/* create the texture coord */
    tx = x / 2 + .5;
    tz = z / 2 + .5;
    if (tx > 1.0 || tz > 1.0 || tx < 0.0 || tz < 0.0) {
     printf("not in range %f %f\n", tx, tz);
    }
    glTexCoord2f(tx, tz);

/* normal */
    glNormal3f(x, y, z);

/* create the coord */
    glVertex3f(x, y, z);

/* adjust u */
    u += incr;
  }
  /* done with the list */
  glEnd();

/* adjust v */
  v += incr;
 }

/* all done with the list */
 glEndList();
}
```

METHOD FOR GENERATING AND INTERACTIVELY VIEWING SPHERICAL IMAGE DATA

This is a Continuation of U.S. appln. Ser. No. 08/813,873, filed on Mar. 7, 1997 now U.S. Pat. No. 5,936,630 (allowed on Nov. 11, 1998), which is a Continuation of U.S. appln. Ser. No. 08/478,839, filed on Jun. 7, 1995, which issued as U.S. Pat. No. 5,684,937 on Nov. 4, 1997, which is a Continuation of U.S. appln. Ser. No., 07/990,250, filed on Dec. 14, 1992 (now abandoned). This is also a Continuation of Ser. No. 09/228,760, filed on Jan. 12, 1999, which claims priority from Provisional Patent Application No. 60/071,148 of Jan. 12, 1998, Ser. No. 09/288,760 being a Continuation-in-Part of U.S. appln. Ser. No. 08/749,166, filed on Nov. 14, 1996 now U.S. Pat. No. 5,903,782, which claims priority from Provisional Patent Application No. 60/006,800 of Nov. 15, 1995.

BACKGROUND OF THE INVENTION

The present invention relates generally to a method for generating and viewing images. More specifically, the present invention relates to a method for generating and viewing full-surround, e.g., spherical, image data.

Systems and techniques for changing the perspective of a visible image in producing a resultant image, and systems and methods of transforming an image from one perspective form to another have been the subject of scientific thought and research for many years. Systems and techniques for transforming visible images can generally be divided into three separate categories:

(1) perspective generation systems and methods suitable for applications such as flight simulators;

(2) three-dimensional (3D) to two-dimensional (2D) conversion systems and methods; and (3) miscellaneous systems and methods.

The first category includes U.S. Pat. No. 3,725,563, which discloses a method of and apparatus for raster scan transformations using rectangular coordinates which are suitable for electronically generating images for flight simulators and the like. More specifically, the '563 patent discloses a technique for raster shaping, whereby an image containing information from one viewpoint is transformed to a simulated image from another viewpoint. Also in this category, U.S. Pat. No. 4,763,280 discloses a curvilinear dynamic image generation system for projecting rectangular coordinate images onto a spherical display surface. In the disclosed system, rectangular coordinates are converted to spherical coordinates and then the spherical coordinates are distorted for accomplishing the desired simulation of curvature.

The second category of systems and techniques perform 3D-to-2D conversion, or vice versa. For example, U.S. Pat. No. 4,821,209 discloses a method of and apparatus for data transformation and clipping in a graphic display system, wherein data transformation is accomplished by matrix multiplication. Also in this second category, U.S. Pat. No. 4,667,236 discloses a television perspective effects system for providing perspective projection whereby each point of a three-dimensional object is projected onto a two-dimensional plane. New coordinates X' and Y' are derived from the original coordinates X, Y and Z, and the viewing distance D, using the general formulas $X'=XD/Z$ and $Y'=YD/Z$. As the object to be displayed is rotated around the X or Y axis, the viewing distance D is changed for each point.

In the third category, miscellaneous systems and methods are disclosed by, for example, U.S. Pat. No. 5,027,287, which describes a device for the digital processing of images to obtain special geometrical effects wherein digital image data corresponding to intersection points on a rectangular X, Y grid are transposed by interpolation with respect to intersection points of a curved surface. The third category also includes U.S. Pat. No. 4,882,679, which discloses a system and associated method of reformatting images for three-dimensional display. The disclosed system is particularly useful for generating three-dimensional images from data generated by diagnostic equipment, such as magnetic resonance imaging equipment.

However, none of the above described methods or systems permit viewing in circular perspective, which is the best way to view spherical data. Circular perspective provides all that linear perspective does when zoomed in, but it allows the viewer to zoom out to the point where the viewer can see substantially everything in the spherical image data simultaneously in a visually palatable and coherent way.

Moreover, it is often difficult to generate the needed spherical image data set for input to a viewing method or corresponding viewing system. In the field of photography, cameras are often fitted with a variety of wide angle lenses so that still photographs of panoramic views can be taken. In addition, digital image processing has made possible the creation of computer generated images of panoramic views from multiple digital images which are, in turn, derived from pictures taken using cameras fitted with conventional lenses.

Each computer generated image is created by digitally stitching the multiple digital images together using software. However, it is difficult to create a seamless computer image from digital images which are derived from analog-based pictures taken using conventional photography techniques, primarily because it is practically impossible to properly align the camera, which is used to take those pictures, between exposures.

Early attempts at digital image processing have produced computer generated images of panoramic views which are cylindrical in nature. In other words, the computer images generated using conventional digital image processing techniques do not provide any views which are either above or below the camera that produced the original analog based pictures from which the digital images are derived.

With the advent of new digital image processing techniques, software has been developed which allows for the transformation of 360 degrees of visual input data in accordance with a particular perspective. The inventor of the present invention recognized a need for devices and methods of taking pictures which capture 360 degrees of spherical visual input data in order to take advantage of the newly developed digital image processing techniques which have been implemented in software. By way of example, one such software algorithm is described in U.S. Pat. No. 5,684,937, by the inventor of the present invention.

What is needed is a method for generating a full-surround, e.g., spherical, data set and subsequently viewing that data set in circular perspective. What is also needed is a method for viewing a spherical image data set in circular perspective which is computationally simple. Preferably, the method for viewing the spherical image data set in circular perspective can be employed on any personal computer (PC) system possessing a three dimensional (3-D) graphics capability.

SUMMARY OF THE INVENTION

Based on the above and foregoing, it can be appreciated that there presently exists a need in the art for methods and corresponding apparatuses for generating and viewing spherical image data which overcome the above-described deficiencies. The present invention was motivated by a desire to overcome the drawbacks and shortcomings of the presently available technology, and thereby fulfill this need in the art.

The present invention implements a novel and practical circular perspective viewer for spherical data. Moreover, it implements the circular perspective viewer within the context of existing 3D graphics utilities native to personal computers (PCs). Thus, the method and corresponding apparatus for circular perspective viewing is practical for a broad market.

One object according to the present invention is to provide a method for modeling the visible world by texture mapping full-surround image data.

Another object according to the present invention is to provide a method for modeling the visible world by texture mapping full-surround image data, i.e., a spherical image data set, onto a p-surface whereby the resultant texture map is substantially equivalent to projecting full-surround image data onto the p-surface from a point Q inside the region X of the p-surface.

Still another object according to the present invention is to provide a method for modeling the visible world by texture mapping full-surround image data wherein the viewer is allowed to interactively rotate the model.

Yet another object according to the present invention is to provide a method for modeling the visible world by texture mapping full-surround image data wherein the viewer is allowed to interactively change the direction of vision.

A still further object according to the present invention is to provide a method for modeling the visible world by texture mapping full-surround image data, wherein the viewer is allowed to interactively alter the focal length or view angle.

Another object according to the present invention is to provide a method for modeling the visible world by texture mapping full-surround image data, wherein the viewer is allowed to interactively change the direction of view.

Still another object according to the present invention is to provide a method for modeling the visible world by texture mapping full-surround image data, wherein the viewpoint is close to the surface of the p-sphere.

Another object according to the present invention is to provide a method for modeling the visible world by texture mapping full-surround image data, wherein the viewer is allowed to interactively move the viewpoint.

A further object according to the present invention is to provide a method for modeling the visible world by texture mapping full-surround image data, wherein the viewer is allowed to select an area of the image and cause another model of the visible world to be loaded into the viewing system.

Another object according to the present invention is to provide a method for modeling the visible world by texture mapping full-surround image data, wherein the viewer is allowed to perform any combination of actions specified immediately above.

In view of the foregoing, it is also an object of the present invention to provide a method for producing a spherical visual data set in order to provide the input for software algorithms which transform visual input data in accordance with a particular perspective.

It will be appreciated that the above-identified objects are merely exemplary and it is not necessary that any of these objects be realized in invention defined by the appended claims. In other words, only certain, and not all, objects of the invention have been specifically described above. Numerous other objects advantageously may be achieved by the invention, as defined in the appended claims, without departing from the spirit and scope of the invention.

These and other objects, features and advantages according to the present invention are provided by a method of modeling the visible world using a seamless spherical data set. Preferably, the method includes steps of taking N different circular images from a common focal point with a wide angle lens, digitizing the N circular images to thereby generate N circular image data sets, respectively, combining the N circular image data sets to minimize coincidence between the N circular image data sets to thereby form the seamless spherical data set, selecting a viewpoint within a p-surface, and texture mapping selected data from the spherical data set onto the p-surface such that the resultant texture map is substantially equivalent to projecting the selected data onto the p-surface from the viewpoint to thereby generate a texture mapped p-surface.

According to one aspect of the invention, the method includes steps of displaying a predetermined portion of the p-surface, selecting a new viewpoint, repeating the texture mapping step using the new viewpoint, and redisplaying the predetermined portion of the p-surface, whereby a first image portion occupying the predetermined portion displayed during the displaying step is different than a second image portion occupying the predetermined portion during the redisplaying step.

These and other objects, features and advantages according to the present invention are provided by a method reciting taking N different circular images from a common focal point with a wide angle lens, digitizing the N circular images to thereby generate N circular image data sets, respectively, combining the N circular image data sets in such a manner as to form a seamless spherical data set, selecting a viewpoint within a p-surface, texture mapping selected data of the spherical data set onto the p-surface such that the resultant texture map is substantially equivalent to projecting the selected data onto the p-surface from the viewpoint to thereby generate a texture mapped p-sphere, and displaying a predetermined portion of the texture mapped p-sphere.

These and other objects, features and advantages according to the present invention are provided by a method comprising using a programmed computer to digitally stitch together at least two digital images that represent the visible world as seen from a fixed focal point and at least two respective directions of view, in such a manner as to generate a spherical image data set.

These and other objects, features and advantages according to the present invention are provided by a method reciting capturing at least two images from a single focal point and different directions of view, digitizing each of the at least two images to thereby generate at least two respective image data sets, and generating a spherical image data set by combining the at least two respective image data sets.

These and other objects, features and advantages according to the present invention are provided by a method reciting using a camera to take a first picture from a focal point and a first direction of view, pivoting the camera about a fixed pivot axis, using the camera to take a second picture from the focal point and a second direction of view opposite to the first direction of view, digitizing the first and second pictures to thereby generate first and second digital pictures, and combining the first and second digital pictures to produce a digital spherical picture.

These and other objects, features and advantages according to the present invention are provided by a method reciting precisely aligning a camera with respect to a first direction of view, taking a first picture with the camera from a prescribed focal point, precisely aligning the camera with respect to a second direction of view opposite to the first direction of view, taking a second picture with the camera from the prescribed focal point, using the first and second pictures to generate a seamless spherical image.

These and other objects, features and advantages according to the present invention are provided by a method for generating a seamless spherical image data set using a camera equipped with a wide angle lens characterized by steps of taking N different circular images from a common focal point within the wide angle lens, digitizing the N circular images to thereby generate N circular image data sets, respectively, and combining the N circular image data sets to minimize coincidence between the N circular image data sets to thereby form the seamless spherical image data set.

These and other objects, features and advantages according to the present invention are provided by a method for generating a seamless spherical image data set using a digital camera equipped with a wide angle lens. Preferably, the method is recites capturing a sequence of N circular image data sets sufficient to form the seamless spherical image data set through the wide angle lens, each of the N circular image data sets representing a unique direction of view, and all of the respective directions of view intersecting a common point within the wide angle lens, and processing the N circular image data sets to eliminate redundant circular image data to thereby form the seamless spherical image data set, where N is a positive integer greater than 1. According to one aspect of the invention, the wide angle lens has a viewing angle of at least 180°, all of the direction of views define a plane, and each direction of view is separated from an adjacent direction of view by an angle equal to 360° divided by N.

BRIEF DESCRIPTION OF THE DRAWINGS

These and various other objects, features and aspects of the present invention will be readily understood with reference to the following detailed description taken in conjunction with the accompanying drawings, in which like or similar numbers are used throughout, and in which:

FIGS. 9A–9J collectively form a listing of the dedicated code for converting a general purpose computer system into the circular perspective viewing system illustrated in FIG. 8;

FIGS. 10A and 10B collectively form a listing of an exemplary code block for triangulating a hemisphere and texture coordinates;

DETAILED DESCRIPTION OF THE PREFERRED EMBODIMENTS

Figure 1:
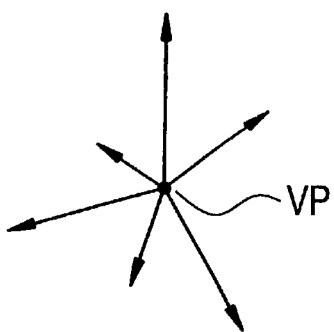
FIG. 1 illustrates a set of all rays from a predetermined viewpoint, which illustration facilitates an understanding of the present invention.

The method and corresponding apparatus according to the present invention are similar to that disclosed in U.S. Pat. No. 5,684,937, which patent is incorporated herein by reference for all purposes, in that it generates perspective views derived for constants less than or equal to two, and greater than or equal to one, i.e., $1.0 \leq X \leq 2.0$. However, it will be appreciated that the inventive method and apparatus are different from U.S. Pat. No. 5,684,937 in that the method for deriving perspective is different than 'explicitly' dividing all angles by a selected constant, as disclosed in the '937 patent. Instead, the angles are 'implicitly' divided by a constant by moving the viewpoint around inside a "p-sphere". Additional details will be provided below.

Additionally, U.S. Pat. No. 5,684,937 also discloses that a closed data set advantageously can be formed from several circular images without parallax or other discontinuity problems by taking each of the circular images from a single focal point. The resultant seamless data set can be likened to what the user would see if the user were located at the center of a sphere looking out from the focal point. Hereinafter, this data set will be referred to as a spherical image data set. It will be noted, as discussed in greater detail below, that the several types of wide angle lenses, e.g., a fisheye lens, generate circular images. All such wide angle lenses are considered to fall within the scope of the present invention.

By employing the method and corresponding apparatus according to the present invention, it is possible to create a virtual PICTOSPHERE™ using a conventional 3-D graphics system. Preferably, the inventive method and apparatus texture map the visible world onto a sphere. It should be mentioned that when the user selects a viewpoint at the center of this sphere and renders the view using the primitives of a conventional 3D graphics system, the user implicitly divides all angles by one, which results in a linear perspective view. However, when the user selects a viewpoint on the surface of this sphere, selects a direction of view towards the center, and renders the view using the primitives of a conventional 3D graphics system, the user implicitly divides all angles by two, thus creating a circular perspective view. Moreover, by allowing the viewpoint to move around within or on the sphere, the user achieves results virtually identical to those achieved by U.S. Pat. No. 5,684,937 for constants ranging from 1.0 to 2.0.

It will be appreciated that the method and corresponding apparatus according to the present invention constitute a novel and practical circular perspective viewer of a spherical image data set. The inventive method and apparatus advantageously can be achieved within the context of existing 3-D graphics utilities and hardware native to PCs. It will be apparent from the statement immediately above that the inventive method and apparatus advantageously can be implemented in a broad range of existing systems.

Figure 2:
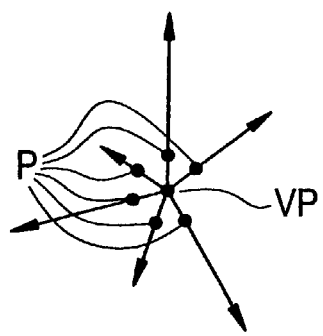
FIG. 2 illustrates a set of points, excluding the viewpoint, located on a corresponding one of the rays, which illustration facilitates an understanding of the present invention.

The method and corresponding apparatus according to the present invention are predicated on the following starting, i.e., given, conditions:

(1) the set of all rays V from a given point VP, as illustrated in FIG. 1;

(2) a set of points P not including VP, each point in P being contained by one and only one ray in V, as illustrated in FIG. 2; and (3) the set of color values C, each color in C being associated with one and only one ray in V, and also thereby associated with the point in P contained by that ray.

Moreover, the following definitions apply:

(1) POINTS P: The visible world.

Figure 3:
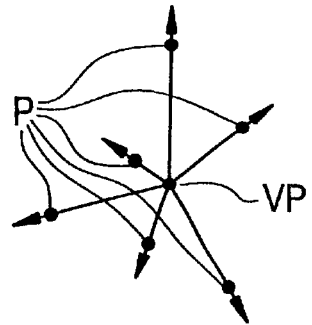
FIG. 3 illustrates the formation of a projection of the set of points, or a subset thereof, illustrated in FIG. 2.
Figure 4A:
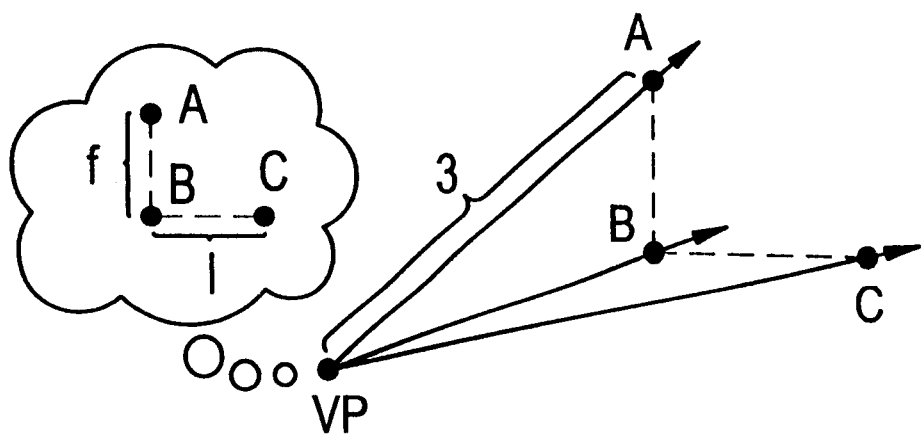
FIGS. 4A and 4B illustrate the resultant images generated by two different projections, respectively, given a constant viewpoint.
Figure 4B:
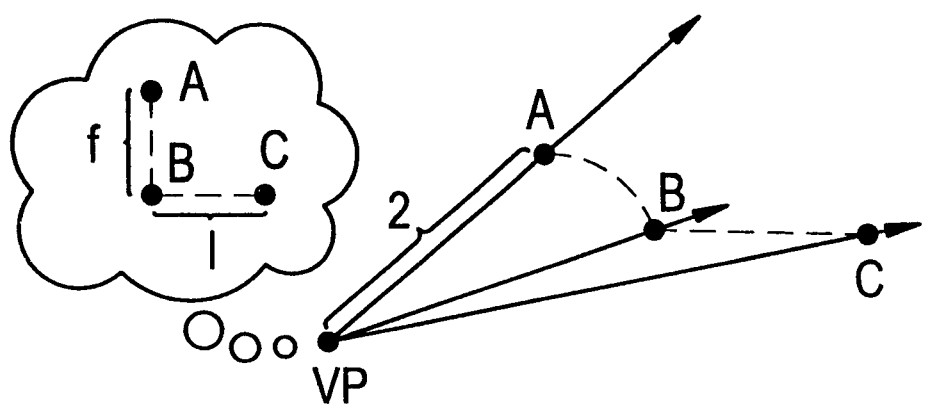

(2) A PROJECTION OF P: A subset of points P. Any number of points Pn contained in P may be slid closer to or further from point VP along their corresponding rays. The resultant new configuration of points P is called a projection of P. The concept can best be understood by referring to FIG. 3;

(3) MAGIC POINT, VIEWPOINT, OR POINT OF PROJECTION: Point VP. Please note, no matter how points P are projected, their appearance will remain the same when viewed from point VP. This latter concept may best be understood by referring to FIGS. 4A and 4B.

(4) FULL-SURROUND IMAGE DATA: data which samples the points P. This data encodes, explicitly or implicitly, the association of a color value with a given direction from a given point of projection. It should be mentioned at this point that full-surround image data is useful in many fields of entertainment because, when delivered to many viewers, it enables the construction of an independent viewing system defined below.

(5) P-SPHERE: a computer graphics representation of any polyhedron where there exists at least one point x inside (neither intersecting, nor lying outside) the polyhedron which may be connected to every point of the polyhedron with a distinct line segment, no portion of which line segment lies outside the polyhedron or intersects the polyhedron at a point not an endpoint. The union of all such points x form the region X of the p-sphere. For a convex p-sphere, the region X is all points of the interior of the p-sphere. Examples of computer graphics objects which may be modeled as p-spheres include a tetrahedron, a cube, a dodecahedron, and a faceted sphere.

(6) P-SURFACE: a computer graphics representation of any surface with a well-defined inside and outside, where there exists at least one point x inside (neither intersecting, nor lying outside) the surface which may be connected to every point of the surface with a distinct line segment, no portion of which line segment lies outside the surface or intersects the surface at a point not an endpoint. The union of all such points x form the region X of the p-surface. For a convex p-surface, the region X is all points of the interior of the p-surface. Examples of computer graphics objects which may be modeled as p-surfaces include: a tetrahedron; a cube; a sphere; an ellipsoid; a cylinder; an apple torus; a lemon torus; and b-spline surfaces, either closed or periodic, in u and v. A p-sphere is a p-surface.

Figure 5:
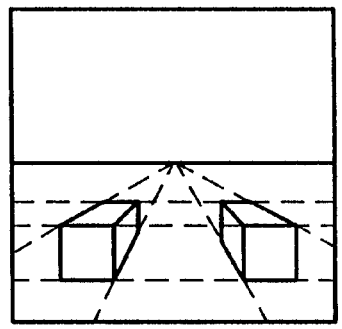
FIG. 5 illustrates the concept of linear perspective.

(7) LINEAR PERSPECTIVE: the projection of a portion of the visible world onto a plane or portion of a plane, as illustrated in FIG. 5.

Figure 6:
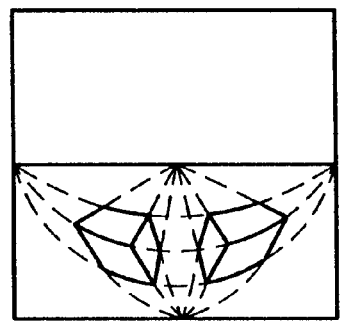
FIG. 6 illustrates the concept of circular perspective.
Figure 7:
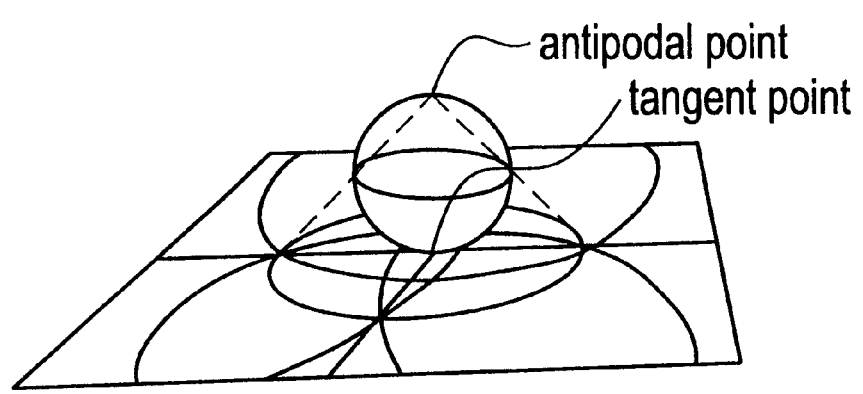
FIG. 7 illustrates the concept of stereographic projection.

(8) CIRCULAR PERSPECTIVE: the projection of the visible world, or portion thereof onto a plane, or a portion of a plane, after performing the perspective transformation of the visible world according to U.S. Pat. No. 5,684,937, where the constant used is 2. After such a transformation, when the direction of vision specified in the transformation is perpendicular to the projection plane, there is a one-to-one mapping of all the points P defining the visible world and all the points of an infinite plane. This definition is illustrated in FIG. 6;

(9) STEREOGRAPHIC PROJECTION: the one-to-one mapping of each point on a sphere to each point of an infinite tangent plane, the mapping being performed by constructing the set of all rays from the antipodal point of the tangent point, the intersection of the rays with the plane defining the mapping. The understanding of this definition will be facilitated by reference to FIG. 7. Please note that circular perspective and stereographic projection produce geometrically similar (identically proportioned) mappings when the direction of vision specified in the perspective transformation of circular perspective contains the tangent point specified in stereographic projection;

(10) INDEPENDENT VIEWING SYSTEM: an interactive viewing system in which multiple viewers can freely, independently of one another, and independently of the source of the image data, pan that image data in all directions with the effect that each viewer feels like they are "inside" of that imagery, or present at the location from which the imagery was produced, recorded, or transmitted; and

(11) STANDARD COMPUTER GRAPHICS SYSTEM: a computer graphics system which supports linear perspective viewing, including the changing of the focal length or the altering of the view angle, the apparent rotation of viewed objects, and/or the apparent changing of direction of vision, and the texture mapping of image data onto objects within the class of a p-surface.

It will be appreciated that, in a standard computer graphics system, by texture mapping full-surround image data onto a p-surface such that the resultant texture map is effectively equivalent to projecting the full-surround imagery onto the p-surface from some point Q contained in the region X of the p-surface, a representation of the visible world is achieved.

Referring to FIGS. 9A through 9G, the method for viewing full-surround, e.g., spherical, image data will now be described. It should be mentioned that the corresponding code implementing the inventive method is written in the "C" language, although a plurality of programming languages are well known and readily adapted to this purpose. It will also be appreciated that code lines starting with "gl" or "glut" indicate calls to a conventional graphics library (GL) such as OpenGL™. One of ordinary skill in the art will readily appreciate that the last function in this listing is called main( ). This is where the program starts.

It will be appreciated from inspection of FIGS. 9A through 9G that the routine main( ) calls various glut . . .

functions to set up GL, the graphics library used here. It will be noted that the glut . . . functions are part of GL. Furthermore, it will be appreciated that main( ) registers or maps certain keyboard events with GL with glutKeyboardFunc(Key). In other words, glutKeyboardFunc(Key) defines the response of the inventive method to operation of the corresponding "Key."

Moreover, Key( ) is a function describing the actions of GL to keyboard events. Of importance are keyboard events ('z' and 'Z') which move the viewpoint in and out along the Z axis relative to the "p-sphere", effectively altering the perspective of the view, and keyboard events (55, 57, 52, 54, 56 and 50) which control rotation of the "p-sphere", effectively allowing the viewer to "look around".

It will be noted that main( ) registers the function display( ) with GL, with the glutDisplayFunc(display) function. Moreover, display( ) uses the global variables controlled by Key( ) to move the viewpoint along the Z axis relative to the "p-sphere", and to rotate the "p-sphere" relative to a constant direction of view.

Preferably, display( ) builds the "p-sphere" with glCallList(current_texture→tex1) and glCallList(current_texture→tex2). In the first instance, tex1 is mapped to a triangulation approximating a hemisphere, and is added to the display list. In the second instance, tex2 is mapped to the same hemisphere—after rotating it 180 degrees to form a sphere—and is also added to the display list, in the function readTexture( ). Preferably, tex1 and tex2 are texture maps built from two pictures, respectively, taken with a fisheye lens from a single viewpoint, although multiple circular images taken with a wide angle lens advantageously can be employed in forming the spherical image data set. Advantageously, tex1 and tex2 collectively comprise a "PICTOSPHERE™." It should be noted that the triangulation approximating the hemisphere was built in the function createHemisphere( ), the fill listing of which is found in FIGS. 10A and 10B and not FIGS. 9A–9G.

At this point, Key( ) and display( ) have been registered with GL. The code main( ) then calls initialize_objects( ) which actually calls the routines readTexture( ) and createHemisphere( ). All the other functions are support functions.

It will be appreciated that the user now has an instance of a p-sphere in GL made by mapping two fisheye images shot from substantially the same focal point, e.g., photographs, to two adjoining hemispheres to thereby generate a full-surround, e.g., spherical, data set. The user advantageously can interactively move the viewpoint away from the center of the p-sphere and, if so desired, very near the inside surface of the p-sphere. It should be mentioned at this point that the direction of view is still towards the center of the p-sphere. Moving the viewpoint from the center of the p-sphere automatically generates a circular perspective view, which advantageously can be displayed on display screen 20 of the PC illustrated in FIG. 8. Moving back to the center of the p-sphere, permits the user to generate a linear perspective view. It will also be appreciated from the discussion above that it is possible to rotate the surface of p-sphere, thus simulating looking around within the p-sphere.

It should be mentioned that by setting the viewpoint of the graphics system close to the center point of the p-sphere point and then enabling the viewer to rotate that p-sphere around a point close to the center point of the p-sphere, an independent viewing system providing linear perspective is achieved. Moreover, by adding the further capability of altering the focal length or angle of view, a zoom ability advantageously can be provided for the user.

It should also be mentioned that in the case where the p-surface used to model the visible world is a good approximation of a sphere, that is, a substantially better model than a tetrahedron or a cube, and where the viewpoint of that representation is close to the approximate center of that p-surface, then by allowing the viewer to move the viewpoint away from the center point to a point close to the surface of the p-surface, an independent viewing system is achieved in circular perspective. This is astounding when one considers that the native graphics system of a conventional PC only supports viewing in linear perspective. The method and corresponding apparatus according to the present invention acheives this astounding breakthrough by employing stereographic projection, which is geometrically similar to circular perspective.

Furthermore, by letting the viewer move the viewpoint outside of the p-surface, the viewer can get a feeling for how the independent viewing works. This can be useful for designers of systems containing many hyper-linked full-surround surfaces. For example, many p-spheres picturing the penthouse terraces of New York City advantageously can be linked together so that the viewer may hop from p-sphere to p-sphere, simulating a tour of the terraces.

Figure 8:
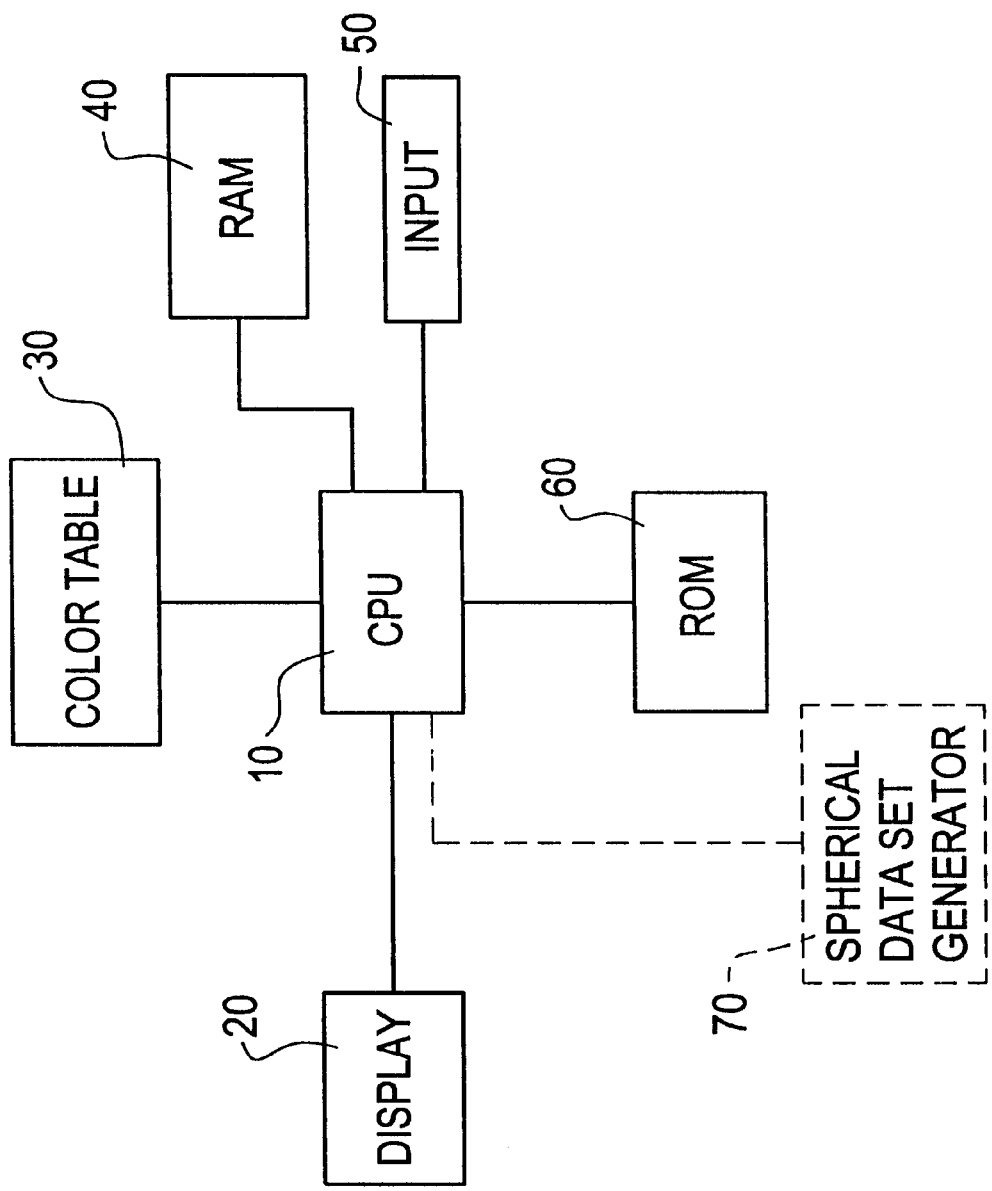
FIG. 8 is a high level block diagram of a circular perspective viewing system according to the present invention.

The above described method of the invention may be performed, for example, by the apparatus shown in FIG. 8. This viewing apparatus is composed of a central processing unit (CPU) 10 for controlling the components of the system in accordance with a control program stored in read-only memory (ROM) 60 or the like. The CPU 10 stores temporary data used during execution of the inventive method, i.e., viewing method, in random-access memory (RAM) 40. After the majority of the method steps are performed, the generated visible points are displayed on display device 20 (e.g., cathode ray tube (CRT) or liquid crystal display (LCD)) as visible points in accordance with the appropriate color values stored in color table 30, e.g., a color lookup table (CLUT) found in the graphics controller in most PCs. Advantageously, a spherical data generator device 70, such as a camera or the like, and preferably the data generator system disclosed in U.S. Pat. No. 5,903,782, which issued May 11, 1999, which patent is discussed immediately below, may be used to generate different color values corresponding to the visible points of a viewed object, image or picture. An input device 50 is provided for entering data such as the viewer's viewing direction, reference plane, configuration (scaling) factor k, and other pertinent information used in the inventive viewing method.

As discussed above, the present invention includes an apparatus and corresponding method for producing a three-hundred and sixty degree (360°) spherical visual data set using a camera fitted with a lens having a particular field of view, i.e., a wide angle lens.

Figure 11:
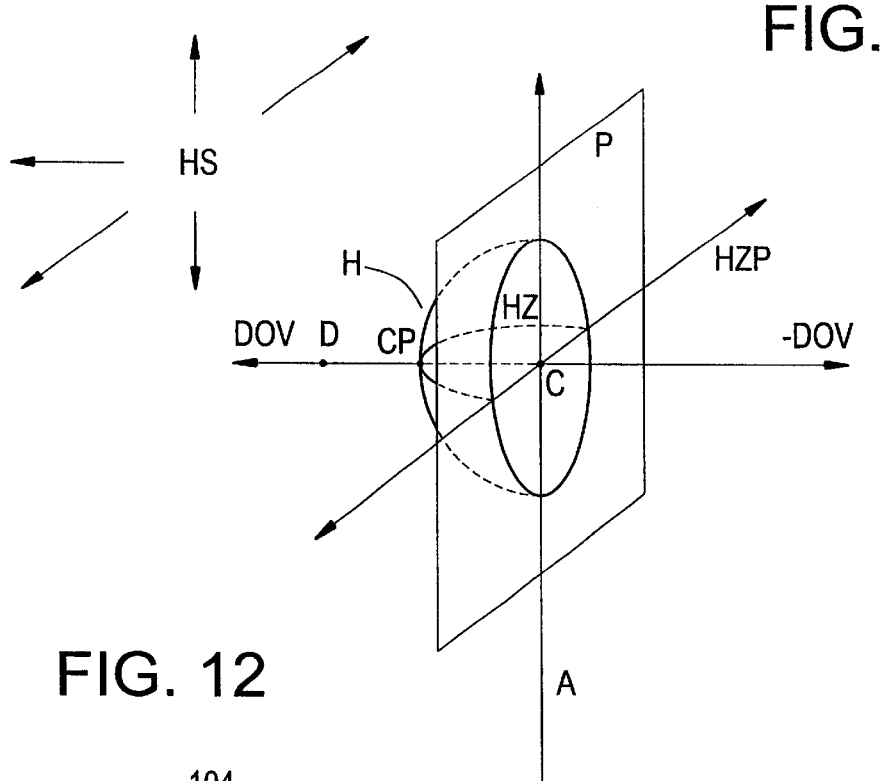
FIG. 11 depicts the field of interest within a field of view of a lens used in conjunction with a present embodiment of the invention.

FIG. 11 depicts a field of interest within a field of view of a lens used in an embodiment of the present invention. The field of interest is some designated 90 degree radius (180 degree) portion of the lens' field of view. This 180 degree portion may be represented as a hemisphere (H) defined by a half-space (HS), which is, in turn, defined by a plane (P). A center point (CP) is designated as the point on the hemisphere furthest from the plane (P).

The direction of vision or view (DOV) is a ray extending from a point (C) in the plane (P) through the center point (CP), point (C) also being the center of the hemisphere (H). Another ray (-DOV) extends from the point (C) in the opposite direction as the ray (DOV). A horizon (HZ) is a circle on the hemisphere (H) that intersects with the center point (CP). A vertical axis (A) is the line on the plane (P)

which is perpendicular to an orthogonal projection (HZP) of horizon (HZ) which is also in the vertical plane (P).

Figure 12:
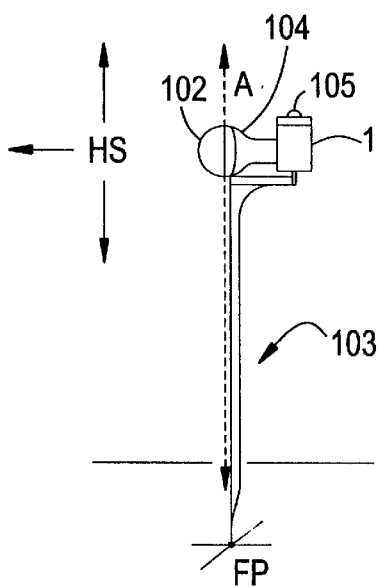
FIG. 12 depicts one embodiment of the present invention which uses a monopod as a mounting support member for a camera having a lens.

FIG. 12 depicts an exemplary apparatus for producing a spherical image data set employed in at least one embodiment of the present invention. The apparatus supports a camera (101) having a lens (102). The camera (101) is mounted on a monopod (103) which is aligned with the vertical axis (A). However, numerous other mounting support members may be employed, such as the tripod described in connection with FIG. 13 below.

The monopod (103) is placed on the ground at a foot point (FP) on the vertical axis (A). The foot point (FP) is a point in a predetermined plane of reference which may be the ground. Preferably, the camera (101) and its associated lens (102) are mounted on the monopod (103) such that neither the camera (101) nor the lens casing (104) are within the half-space (HS). Although a bubble level (105) is placed on the camera, one of ordinary skill will appreciate that the bubble level (105) may be mounted on the monopod (103) instead.

The bubble level (105) should be mounted so that when it is level, the vertical axis (A) will be plumb with respect to the predetermined plane of reference. The plumbness of the vertical axis (A) should be maintained with respect to the predetermined plane of reference and the lens (102) aligned azimuth-wise in the plane (P) described above in connection with FIG. 11. Preferably, a fixed light source is also aligned in the plane (P). A first picture is then taken. Subsequently, the apparatus is pivoted one-hundred and eighty degrees around the vertical axis while maintaining the foot point (FP) in the same position in preparation for the taking of an additional picture.

Another plumbing device may be employed in lieu of the bubble device. By way of example, the bubble level may be replaced with two tube levels which are positioned at right angles to one another.

Figure 13:
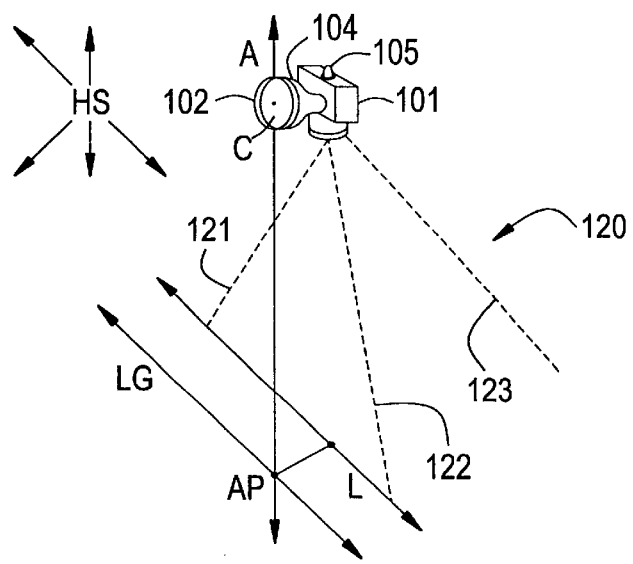
FIG. 13 depicts another embodiment of the present invention which uses a tripod as a mounting support member for a camera having a lens.

If the camera and its associated lens are too heavy to put on a monopod, then a tripod can be employed as the mounting support member. A tripod is especially advantageous in time lapse photography or motion picture photography. An embodiment of the present invention employing a tripod is shown in FIG. 13. Elements depicted in FIG. 13 which are similar to those shown in FIG. 12 retain their same identifier. These elements include the camera (101), lens (102), lens casing (104), and bubble level (105).

The tripod (120) is adjusted so that its two front legs (121) and (122) form a plane roughly parallel to the vertical axis (A). The third leg (123) can be extended or retracted to achieve this objective. The line (L) connects the feet of the front legs (121) and (122) which are adjusted so that the line (L) is parallel to the plane (P). In this configuration, the tripod forms roughly a right-angled three-sided prism. Preferably, no part of the tripod is within the half-space (HS). Point (AP) where axis (A) intersects the ground is determined using a plumb line dropped from the point (C) to the ground. The point (AP) corresponds to the point (FP) depicted in FIG. 12.

Figure 14A:
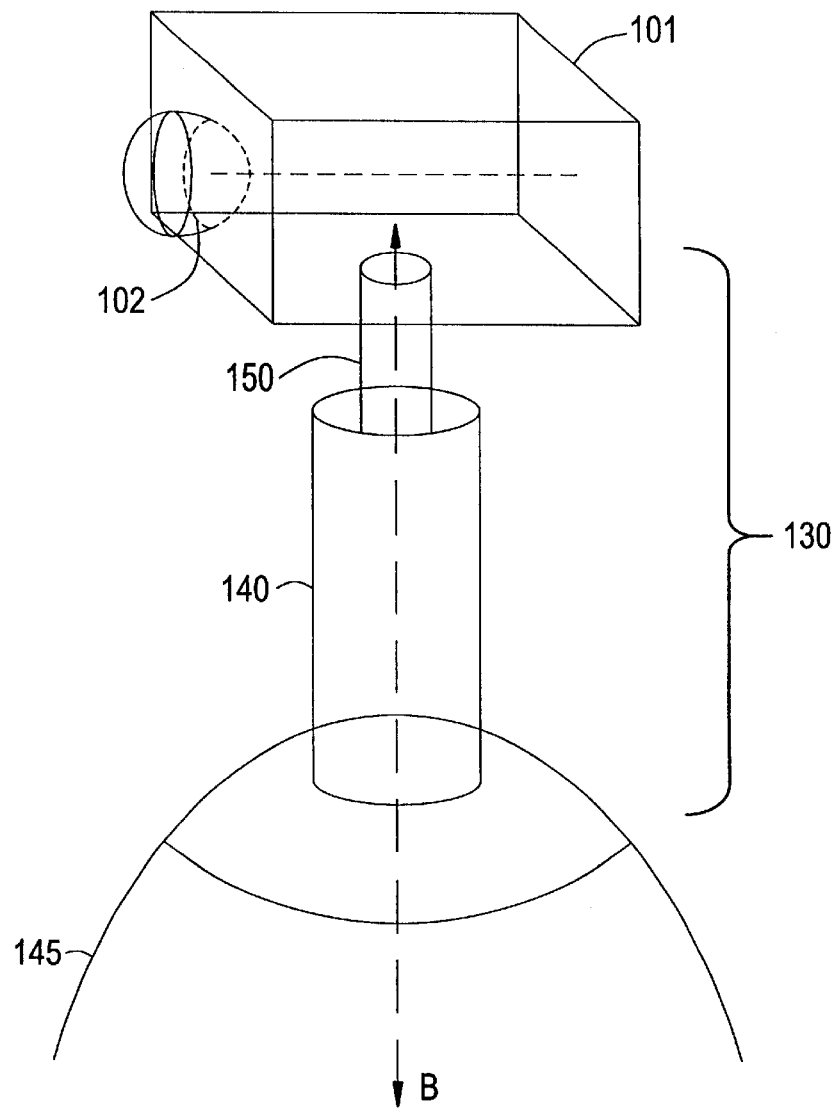
FIGS. 14A, 14B, and 14C depict features of a mounting component which is employed in an embodiment of the present invention.
Figure 14B:
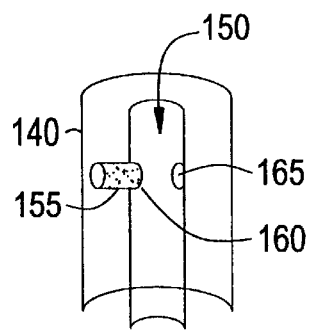
Figure 14C:
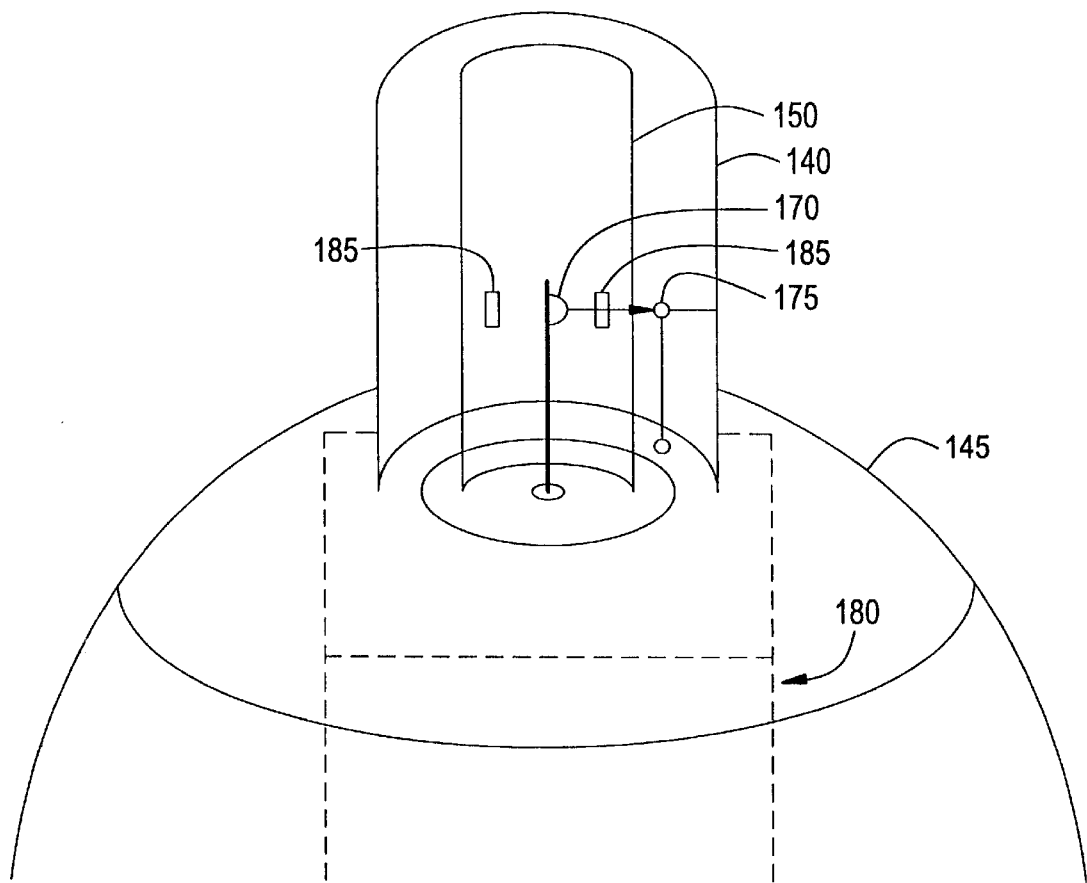

Further refinements are possible with respect to the above-described embodiments of the present invention. Specifically, an apparatus according to the present invention may also include a mounting component (130), as shown in FIGS. 14A, 14B and 14C. Elements which are similar to those shown in FIG. 11 retain their same identifier. These elements include the camera (101) and the lens (102). The mounting component (130) includes an outer sleeve (140) which is detachably connected to the mounting support member (145). The mounting component (130) also includes an inner cylinder (150) which is detachably connected to the camera (101). The inner cylinder (150) rotates inside the outer sleeve (140) around axis (B) and clicks into place in a first direction (D) or a second opposite direction (–D) through the use of a spring-loaded pin (155) which is included in the outer sleeve (140), as shown in FIG. 14B.

The spring-loaded pin (155) forms a tight fit with either of two rounded notches (160 and 165) on opposite sides of the inner cylinder (150). The mounting component (130) can be adjusted so that the axis (A) of the field of interest of the lens (102) can be aligned with axis (B) when the camera (101) is attached to the mounting support member (145) via the mounting component (130).

As a further refinement, the mounting component (130) can be fitted with an LED (170) and optical sensor (175) instead of the spring-loaded pin (155), as shown in FIG. 14C. In this regard, the rotation of the inner cylinder (150) of the mounting component (130) can be electro-mechanically controlled via an electro-mechanical controller (180) in response to the detection of a light beam from the LED (170) or alternative light source by the optical sensor (175). The electro-mechanical controller (180) is positioned beneath the surface of the mounting support member (145) and is operatively connected to the inner cylinder (150) to control the rotation thereof. However, the electro-mechanical controller (180) need not be positioned beneath the surface of the mounting support member (145).

More specifically, the light beam, which is produced by the LED (170) disposed within the inner cylinder (150) of the mounting component (130), can be detected by the optical sensor (175), which is disposed on the outer sleeve (140) of the mounting component (130), through a slit (185) in the inner cylinder (130). However, those of ordinary skill in the art will appreciate that the LED (170) could be disposed on the outer sleeve (140) of the mounting component, while the optical sensor (175) is disposed within the inner cylinder (150) of the mounting component (130).

The camera (101) which is detachably connected to the inner cylinder (150) rotates in accordance with the rotation of the inner cylinder (150) so that the camera (101) can be made to take a picture in one direction (DOV) and then in an opposite direction (–DOV).

An additional embodiment of an apparatus according to the present invention can be realized by utilizing a mounting support member which is capable of supporting two cameras and two opposing lenses, the lenses being aligned so that point (CP) for each lens faces in opposite directions. However, parallax problems may result from the use of two cameras to the extent that each lens is prevented from being physically located so that the respective focal points of the lenses are identical. In this regard, the size of the cameras and the lens casings are important considerations because of the parallax problems which may arise from their combined use. It will be appreciated that the parallax problem would prevent the formation of a substantially seamless spherical image data set.

Advantageously, the apparatus can also be provided with a registering means for registering ray (DOV) or ray (–DOV). However, the registering means may register a predetermined reference ray other than ray (DOV) or ray (–DOV). By way of example, the registering means may be comprised of finder scopes, or a combination of laser reflection and photoelectric elements. Alternatively, the registering means may include a gyroscopic element.

The mounting support member can also include a gimbal mount which fits around a circular lens casing. However, the gimbal mount's axis should be made coincident with line (HZP) shown in FIG. 11 and the legs should be positioned so that they are coincident with plane (P), which is also shown in FIG. 11.

Advantageously, the mounting support member can be made of transparent and non-reflective materials in order to reduce the chance that the picture will be corrupted by the presence of the mounting support member in the resulting picture.

Figure 15:
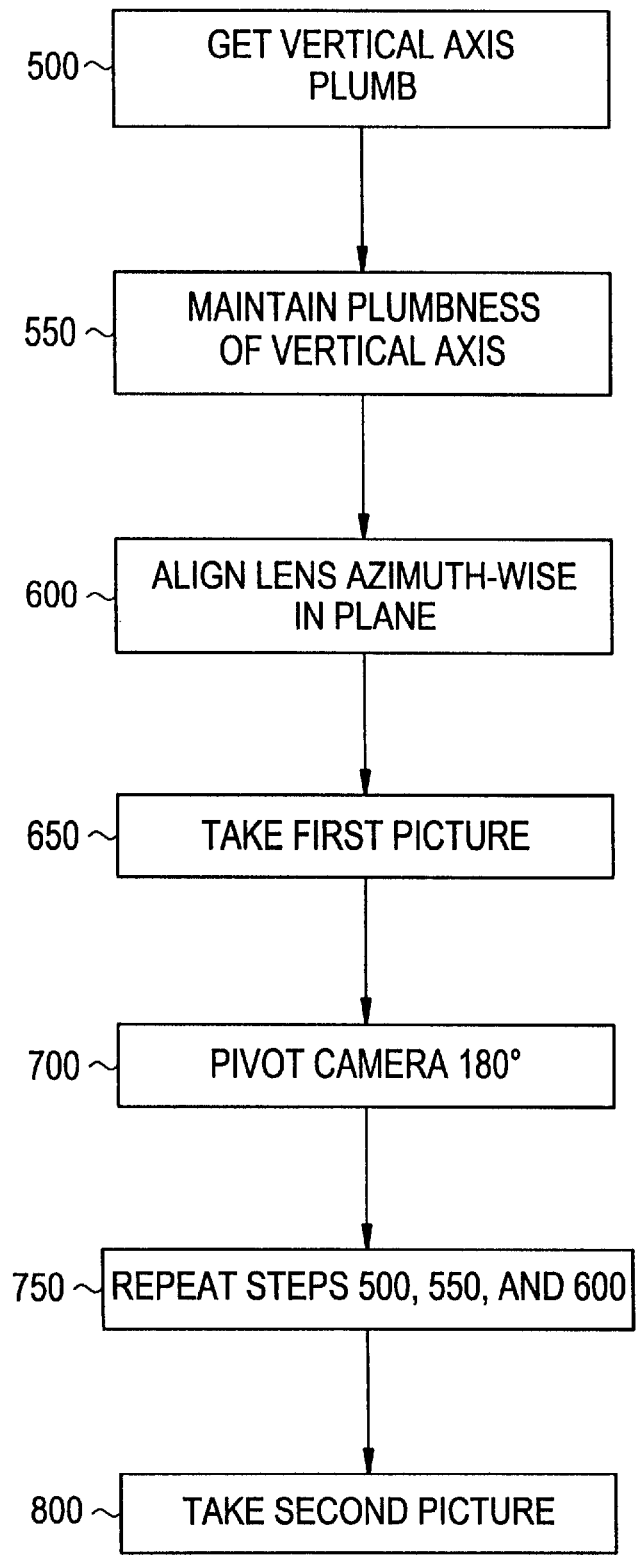
FIG. 15 is a flow chart which depicts a method according to one aspect of the present invention.

A method of producing a 360° spherical visual input data set is also provided in accordance with the present invention. The method is described with reference to the lens having the exemplary field of view shown in FIG. 11, although the method works equally well with any wide angle lens. The flow chart depicted in FIG. 15 identifies the steps of the method.

According to the present invention, the method includes the step 500 of getting the vertical axis (A) plumb with respect to a predetermined plane of reference which may be the ground. This step 500 can be accomplished using a plumbing device such as the bubble level described above or a conventional plumb line. The method also includes the step 550 of maintaining the plumbness of the vertical axis (A) with respect to the predetermined plane of reference and the step 600 of aligning the lens azimuth-wise in the plane (P). Preferably, a fixed light source is also aligned in plane (P) in order to provide adequate lighting for the taking of the picture.

In addition, the method also includes the step 650 of taking a first picture using the camera and the step 700 of pivoting the camera 180 degrees around the axis (A). By way of example, if a monopod is being used as the mounting support member for the camera and its associated lens, as shown in FIG. 2, the monopod is rotated 180 degrees while keeping the foot print (FP) the same.

However, if a tripod is used as the mounting support member instead of the monopod, as shown in FIG. 13, then a line (LG) is first delineated on the ground (or an alternate predetermined plane of reference) representing the intersection of plane (P) with the ground. The line (LG) also passes through the point (AP), as discussed above in connection with FIG. 13. The tripod is then adjusted so that its front two legs rest on a line (L) which is roughly parallel to the line (LG).

The remaining leg is then adjusted until the plumbing device indicates that the vertical axis (A) is plumb. The first picture is then taken using the camera Subsequently, the entire apparatus is rotated 180 degrees. The proper alignment of the apparatus is confirmed by determining whether the front two feet of the tripod again form a line which is parallel to the line (LG) and by determining whether point (C) forms a line which is plumb and which contains the point (AP).

Following the pivoting of the camera and its associated lens, steps 500, 550 and 600 are repeated in step 750. Finally, in step 800 a second picture is taken to complete the acquisition of three-hundred and sixty degrees (360°) of spherical visual data.

As mentioned above, it will be appreciated that the viewing method and corresponding viewing apparatus according to the present invention advantageously can be used in an audiovisual or multimedia entertainment system. In particular, since each user advantageously can select his or her preferred viewpoint and direction of view, multiple users can receive a single set of full-surround image data and generate corresponding multiple display images, in either linear or circular perspective.

Although the preferred embodiments of the present invention have been described, the spirit and scope of the invention is by no means restricted to what is described above. For example, a digital camera may be employed avoiding the necessity of converting analog based pictures into digital format to facilitate the production of computer generated images using software algorithms which transform the spherical image data set in accordance with a particular perspective. Thus, although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of modeling the visible world using a seamless spherical data set, said method comprising:
   taking N different circular images from a common focal point with a wide angle lens;
   digitizing the N circular images to thereby generate N circular image data sets, respectively;
   combining the N circular image data sets to minimize coincidence between the N circular image data sets to thereby form the seamless spherical data set;
   selecting a viewpoint within a p-surface; and
   texture mapping selected data from the spherical data set onto said p-surface such that the resultant texture map is substantially equivalent to projecting the selected data onto the p-surface from said viewpoint to thereby generate a texture mapped p-surface.

2. The method as recited in claim 1, further comprising rotating said texture mapped p-surface so as to simulate rotating the direction of view in the opposite direction.

3. The method as recited in claim 1, wherein said selecting step comprises selecting the viewpoint and a direction of view, and wherein said method further comprises interactively changing said direction of view to thereby expose a corresponding portion of said texture mapped p-surface.

4. The method as recited in claim 1, further comprising displaying a predetermined portion of said texture mapped p-surface.

5. The method as recited in claim 4, wherein the viewer is allowed to interactively alter at least one of focal length or an angle of view relative to said textured mapped p-surface to thereby vary the displayed portion of said texture mapped p-surface.

6. The method as recited in claim 1, further comprising:
   displaying a predetermined portion of said p-surface;
   selecting a new viewpoint;
   repeating said texture mapping step using said new viewpoint; and
   redisplaying said predetermined portion of said p-surface, whereby a first image portion occupying said predetermined portion displayed during the displaying step is different than a second image portion occupying said predetermined portion during the redisplaying step.

7. The method as recited in claim 6, wherein said selecting step comprises interactively selecting said new viewpoint.

8. The method as recited in claim 7, wherein a first said texture mapped p-surface is replaced by a second texture mapped p-surface by interactively selecting said new viewpoint from viewpoints within said second texture mapped p-surface.

9. The method as recited in claim 1, further comprising:
   selecting a new viewpoint; and
   displaying said texture mapped p-surface from said new viewpoint.

10. The method as recited in claim 9, wherein the new viewpoint is proximate the surface of said p-surface.

11. A method comprising:
taking N different circular images from a common focal point with a wide angle lens;
digitizing the N circular images to thereby generate N circular image data sets, respectively;
combining the N circular image data sets in such a manner as to form a seamless spherical data set;
selecting a viewpoint within a p-surface;
texture mapping selected data of the spherical data set onto said p-surface such that the resultant texture map is substantially equivalent to projecting the selected data onto the p-surface from said viewpoint to thereby generate a texture mapped p-sphere; and
displaying a predetermined portion of said texture mapped p-sphere.

12. The method as recited in claim 11, further comprising rotating said texture mapped p-sphere so as to simulate rotating the direction of view in the opposite direction.

13. The method as recited in claim 11, wherein said selecting step comprises selecting the viewpoint and a direction of view, and wherein said method further comprises interactively changing said direction of view to thereby display another portion of said texture mapped p-sphere.

14. The method as recited in claim 11, further comprising:
selecting a new viewpoint; and
repeating said texture mapping and said displaying steps using said new viewpoint.

15. The method as recited in claim 14, wherein a first said texture mapped p-sphere is replaced by a second said texture mapped p-sphere by interactively selecting said new viewpoint from viewpoints within said second texture mapped p-sphere.

16. The method as recited in claim 11, further comprising:
selecting a new viewpoint; and
displaying said predetermined portion of said texture mapped p-surface using said new viewpoint.

17. The method as recited in claim 16, wherein said selecting step comprises interactively selecting said new viewpoint.

18. A method comprising using a programmed computer to digitally stitch together at least two digital circular images that represent the visible world as seen from a fixed point and at least two respective directions of view, in such a manner as to generate a spherical image data set.

19. The method as set forth in claim 18, further comprising using the spherical image data set to display a seamless image on a display device.

20. The method as set forth in claim 18, further comprising using a programmed computer graphics system to generate an image in a selected one of two different perspectives in response to the spherical image data set.

21. The method as set forth in claim 18, wherein each of the at least two digital images is a circular digital image generated using a fisheye lens.

22. A method comprising:
capturing at least two circular images from a single focal point and different directions of view;
digitizing each of the at least two circular images to thereby generate at least two respective image data sets; and,
generating a spherical image data set by combining the at least two respective image data sets.

23. The method as set forth in claim 22, wherein each of the at least two images is a circular image generated by a fisheye lens.

24. The method as set forth in claim 22, further comprising displaying a seamless image in response to the spherical image data set.

25. The method as set forth in claim 24, wherein the spherical data set represents a portion of the visible world that would be seen by a viewer having a 360° field of view from the single point.

26. The method as set forth in claim 24, wherein a computer generated image produced using the spherical data set constitutes a visual depiction of a 360° field of view of the visible world from the single point.

27. The method as set forth in claim 24, wherein the spherical data set represents a 360° field of view of the visible world from a specified viewpoint.

28. The method as set forth in claim 22, further comprising using a programmed computer graphics system to generate a displayed image in one of linear perspective and circular perspective in response to the spherical image data set.

29. The method as set forth in claim 22, wherein the capturing is performed using a single wide-angle lens.

30. The method as set forth in claim 22, wherein the capturing is performed using a single fisheye lens.

31. The method as set forth in claim 22, wherein the capturing is performed by taking at least two respective shots with a single camera with each respective shot being aligned with respect to the previously-taken shot.

32. The method as set forth in claim 22, wherein the capturing is performed by taking at least two respective shots with a single camera with each respective shot being precisely registered with respect to the previously-taken shot.

33. A method comprising:
using a camera to take a first circular picture from a focal point and a first direction of view;
pivoting the camera about a fixed pivot axis;
using the camera to take a second circular picture from the focal point and a second direction of view opposite to the first direction of view;
digitizing the first and second circular pictures to thereby generate first and second digital pictures; and,
combining the first and second digital pictures to produce a digital spherical data set.

34. The method as set forth in claim 33, wherein the camera is a digital camera.

35. The method as set forth in claim 33, wherein the first and second circular pictures are each generated using a fisheye lens optically connected to the camera.

36. The method as set forth in claim 33, wherein the pivoting is performed in such a manner as to precisely register the first and second directions of view.

37. A method comprising:
precisely aligning a camera with respect to a first direction of view;
taking a first circular picture with the camera from a prescribed point;
aligning the camera with respect to a second direction of view substantially co-linear with the first direction of view;
taking a second circular picture with the camera from the prescribed point;
using the first and second circular pictures to generate a substantially seamless spherical data set.

38. The method as set forth in claim 37, wherein the substantially seamless spherical data set represents a 360° field of view of the visible world from the prescribed focal point.

39. The method as set forth in claim 37, wherein the first and second circular pictures are each generated by a fisheye lens optically coupled to the camera.

40. The method as set forth in claim 37, wherein the camera is a digital camera.

41. The method as set forth in claim 37, wherein the camera is equipped with a wide angle lens.

42. The method as set forth in claim 37, wherein the camera is equipped with a fisheye lens.

43. A method for generating a substantially seamless spherical image data set using a camera equipped with a wide angle lens, comprising:

taking N different circular images from a common point within the wide angle lens;

digitizing the N circular images to thereby generate N circular image data sets, respectively; and combining the N circular image data sets to minimize coincidence between the N circular image data sets to thereby form the substantially seamless spherical image data set.

44. A method for generating a seamless spherical image data set using a digital camera equipped with a wide angle lens, comprising:

capturing a sequence of N circular image data sets sufficient to form the seamless spherical image data set through the wide angle lens, each of the N circular image data sets representing a unique direction of view, and all of the respective directions of view intersecting a common point within the wide angle lens; and processing the N circular image data sets to eliminate redundant circular image data to thereby form the seamless spherical image data set, where N is a positive integer greater than 1.

45. The method as recited in claim 44, wherein:

the wide angle lens comprises a fisheye lens, and each of the N circular image data sets corresponds to a projection of a hemisphere on a plane.

46. The method as recited in claim 44, wherein:

the wide angle lens comprises a fisheye lens; and

N is equal to 2.

47. The method as recited in claim 44, wherein:

the wide angle lens comprises a lens having a viewing angle of at least 180°; and N is greater than or equal to 2.

48. The method as recited in claim 44, wherein:

the wide angle lens comprises a lens having a viewing angle of at least 180°;

all of the direction of views define a plane; and each direction of view is separated from an adjacent direction of view by an angle equal to 360° divided by N.

* * * * *